United States Patent [19]

Tashlick

[11] 4,268,047
[45] * May 19, 1981

[54] UNDERGROUND PIPE JOINT WITH HYDRATABLE CEMENT IN POLYURETHANE GASKET

[75] Inventor: Irving Tashlick, Bradley Beach, N.J.

[73] Assignee: Interpace Corporation, Parsippany, N.J.

[*] Notice: The portion of the term of this patent subsequent to Dec. 2, 1992, has been disclaimed.

[21] Appl. No.: 963,746

[22] Filed: Nov. 27, 1978

Related U.S. Application Data

[60] Continuation-in-part of Ser. No. 536,239, Dec. 24, 1974, abandoned, which is a division of Ser. No. 462,041, Apr. 18, 1974, Pat. No. 3,923,311.

[51] Int. Cl.³ .................... F16J 15/10; F16J 15/38
[52] U.S. Cl. ........................... 277/207 A; 277/227
[58] Field of Search .............. 277/207, 1, 237 R, 229, 277/227, DIG. 2; 285/284, 130, 131, 245

[56] References Cited

U.S. PATENT DOCUMENTS 3,897,073  7/1975  Swanson et al. ............. 277/DIG. 2
3,909,010  9/1975  Swanson et al. ............. 277/DIG. 2

Primary Examiner—Robert I. Smith
Attorney, Agent, or Firm—Charles E. Baxley

[57] ABSTRACT

This disclosure teaches a system for placing structurally an inorganic alkaline sealant (such as portland cement) by dispersing the alkaline sealant in a polyurethane foam material. The foam material may be cast and fabricated into bands, gaskets, joint packings and other structural elements which are placed in locations such as joints, cracks or the like where they are needed for sealing or protective functions. The alkaline sealant forms a rocklike mass when exposed to water and also releases alkalinity so as to protect adjacent metal surfaces. Gradual release of the alkalinity sustains protection of the metal surfaces for an extremely long time.

2 Claims, 4 Drawing Figures

UNDERGROUND PIPE JOINT WITH HYDRATABLE CEMENT IN POLYURETHANE GASKET

CROSS REFERENCE

This is a continuation-in-part application with respect to my copending U.S. patent application Ser. No. 536,239 filed Dec. 24, 1974 and now abandoned, which in turn was a divisional application with respect to then copending U.S. patent application Ser. No. 462,041 filed Apr. 18, 1974 and now U.S. Pat. No. 3,923,311.

BACKGROUND OF THE INVENTION

This invention is applicable generally to placing structural materials containing an inorganic alkaline sealant (for example, portland cement) to form a substantially rocklike mass useful for sealing and the like. Release of alkalinity from the mass also may be employed for protecting adjacent metal parts from corrosion. Although the invention clearly has much wide applicability, for ease of presentation it will be discussed here with reference to specific application in an underground pipeline and more particularly to joints in such an underground pipeline having metal parts which need to be protected from corrosion. In the usual practice of laying a pipeline for underground service, the pipes are placed in an open trench with a spigot end of one pipe fitted into a bell end of a last laid adjoining pipe. Such underground pipelines frequently are made of reinforced or prestressed concrete pipes each fitted with a steel bell ring at one of its ends and a steel spigot ring at its other end. Generally the spigot ring has an annularly formed groove into which is positioned a rubber gasket. When the spigot containing the gasket is inserted into the bell of the last laid pipe, the rubber gasket is compressed between the spigot groove and an inside annular face of the bell, thus effecting a watertight joint. Because of necessity of providing this means of joining and compressing the gasket, adjacent portions of the bell and spigot rings necessarily are exposed and may be subjected to corrosive influences depending upon character of enveloping soil and presence of moisture.

It has been customery practice to apply a diaper like form of burlap or the like (and generally referred to in industry as a "diaper") around the joint and to pour portland cement grout therein. When installed properly, the diaper offers an excellent means of assuring long term protection of the joint; however, both field and laboratory observations have shown that commonly there has been a lack of proper workmanship in installing such diapers, with the result that full value of these diapers often has not been realized. In part this lack is due to difficulty involved in proper application of the diapers and in part to inability of providing foolproof inspection of the diapered joints prior to their burial.

Another disadvantage of protecting the joints with mortar poured into diapers is excessive cost. A contractor is obliged to use at least one extra man performing the operation, even in the smallest of pipe sizes. For larger pipe sizes, a larger crew is needed together with necessary mixing and logistical support equipment. A further disadvantage is a requirement that excavated trenches which may fill with water generally percolating in from surrounding soil, must be dewatered prior to placement of the diapers and pouring of the grout. Yet another disadvantage of this method is a difficulty that grout pouring crews have in maintaining a proper sequence of trenching, pipe joining and backfilling. It is usual, therfore, to have excessively long lengths of open trenches with exposed joints being readied for grouting. Long lengths of open trenches pose hazards to the public and present an unsightly appearance. Cold weather is a further problem because pouring grout then requires apparatus to keep it at proper levels of temperature.

STATEMENT OF INVENTION

Problems of the prior art have been solved in a particularly useful, novel, unobvious and facile way. In accordance with one preferred embodiment of this invention, as applied to pipe joints having spigots and bells, an inorganic alkaline sealant (here portland cement) is dispersed in a mixture of suitable polyols and a catalyst along with a forming agent; a polyfunctional isocyanate is added to the mixture and (after stirring) the mixture is poured into a mold. The mold is closed and the mixture is allowed to foam so as to produce a polyurethane foam having the inorganic alkaline sealant suspended therein. The polyurethane foam is shaped to form a band which is placed about the spigot. Thereafter the spigot is inserted in the usual manner into its mating bell of a last laid pipe. The spigot band thus is compressed into a joint recess between the spigot and the bell. Water which enters the joint recess causes the sealant to form a rocklike mass providing a seal for the joint. With time the water causes deterioration of the polyurethane foam material thereby gradually exposing additional amounts of the alkaline sealant so that protection of metal surfaces is sustained for an extremely long time. Accordingly this system results not only in a rocklike sealing mass, but also in extremely long term protection of metal surfaces.

One object of this invention is to allow convenient placing of the inorganic alkaline sealant suspended in a polyurethane foam material.

Another object of this invention is to assure uniform release of alkalinity over a long period of time.

Still another object of this invention is to achieve time controlled release of the alkalinity from the polyurethane foam material by progressive release therefrom.

Still another object of this invention is to provide a system for positioning the alkaline substance where accessibility normally is difficult.

Still another object of this invention is to position the inorganic alkaline sealant underground to protect metal parts from corrosive effects of soil, water and the like.

Still another object of this invention is to form a rocklike sealing and metal protecting mass in a joint recess.

Still another object of this invention is to seal and protect underground pipe joints formed by mating bells and spigots with or without metal parts.

Still another object of this invention is to place the inorganic alkaline sealant underground in joints of elliptical pipes and pipes having low headroom.

Still another object of this invention is to improve service life of systems as here contemplated.

Still another object of this invention is to improve shelf life of systems wherein the inorganic alkaline sealant is suspended in a polyurethane foam material as here contemplated.

Still another object of this invention is to improve field handling of systems as here contemplated.

Still another object of this invention is to provide a system as here contemplated which is particularly well suited to portland cement as the inorganic alkaline sealant.

Still another object of this invention is to provide a system as here contemplated for placing an inorganic alkaline sealant at less cost, using less personnel and less equipment, than by prior art systems.

Still another object of this invention is to provide a system as here contemplated for placing an inorganic alkaline sealant to seal and protect underground pipe joints with minimal open trenching, thereby reducing hazards.

Still another object of this invention is to provide a system as here contemplated for placing an inorganic alkaline sealant to seal and protect underground pipe joints which system is virtually foolproof and which can be checked easily for proper application.

Still another object of this invention is to provide a more rapid system as here contemplated to seal and protect underground pipe joints so as to minimize the length of time a trench must be kept open.

Still another object of this invention is to provide a system as here contemplated to seal and protect underground pipe joints where the pipe trench contains water.

Still another object of this invention is to provide a system as here contemplated for placing an inorganic alkaline sealant to seal and protect underground pipe joints which system can be employed when temperatures are below freezing.

Still another object of this invention is to provide a system as here contemplated for placing an inorganic alkaline sealant to seal and protect underground pipe joints which system is suited well otherwise to its intended function.

Sealing of joints from ground water entering from the exteriors of the joints is a primary objective in obtaining satisfactory service of a buried pipeline and is accomplished by use of a spigot band. Also fluid being transported through the pipeline may require the interiors of the joints to be sealed so as to prevent escape of the fluid. Sealing of the interior of a joint is accomplished by inserting a bell band into the annular bell opening of that joint. The bell band may stay in place prior to insertion of its mating spigot due to its own elastic character or it may be provided with an adhesive by means of which it is secured to the surface of the bell. Use of the bell band obviates necessity of workmen entering the interior of the pipeline (after jointing) to mortar the insides of the joints.

DESCRIPTION OF DRAWINGS

The foregoing and other objects, features and advantages will be understood more fully from a detailed description of a preferred embodiment of this invention which follows as well as from claims which also follow, all viewed in conjunction with an accompanying drawing wherein like numerals designate like parts and wherein:

DESCRIPTION OF PREFERRED EMBODIMENT

Figure 1:
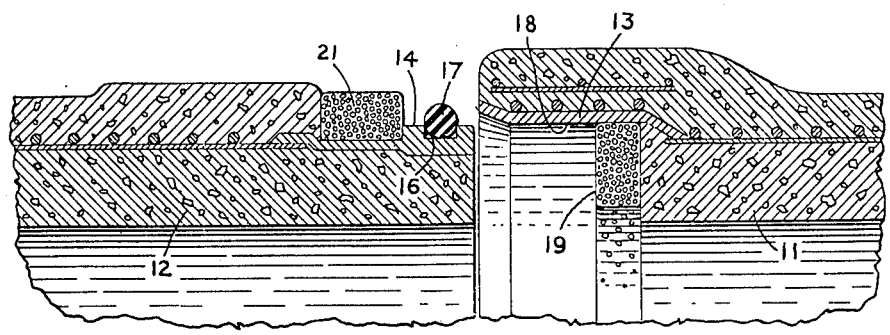
FIG. 1 is a partial vertical sectional view of a rubber and steel pipe connection for a reinforced concrete pipe joint with metal bell and spigot rings spaced apart from each other and protected in accordance with this invention.

Referring to the drawing which illustrates a preferred embodiment of this invention, pipes 11 and 12 generally are made of reinforced concrete or prestressed concrete and are fitted respectively with a steel bell ring 13 and a steel spigot ring 14 at their respective ends. The spigot ring 14 has an annular formed groove 16 into which is positioned a rubber gasket 17. When the spigot ring 14 (with the rubber gasket 17 thereon) is inserted into the bell ring 13, the rubber gasket 17 is compressed in the spigot ring groove 16 by an inside annular face 18 of the bell ring 13, thus effecting a watertight seal therebetween.

Figure 2:
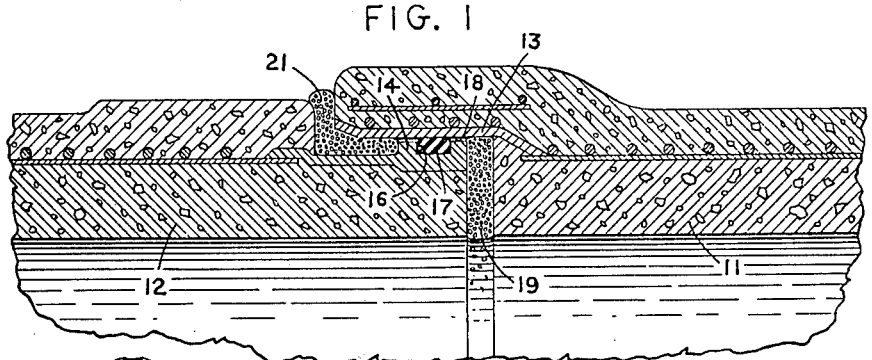
FIG. 2 is the same as FIG. 1 with the spigot engaged into the bell.
Figure 3:
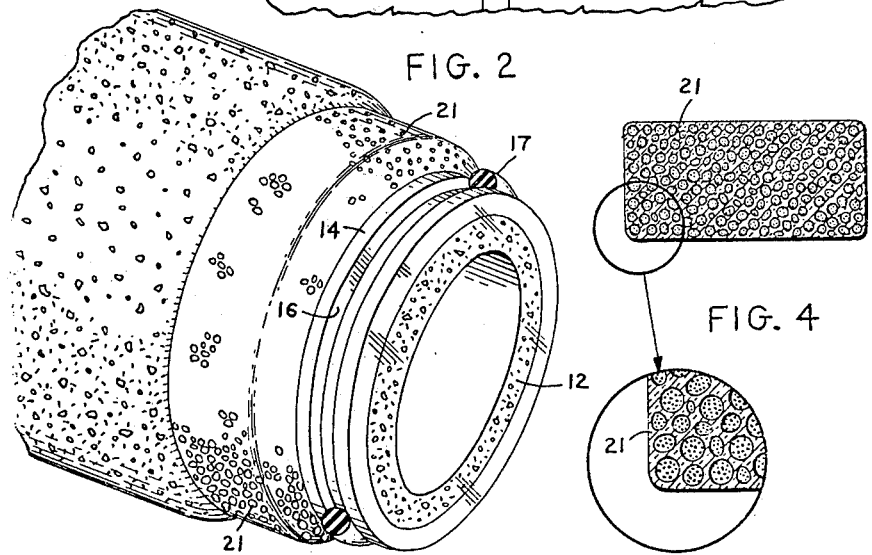
FIG. 3 is a perspective view of a spigot band according to this invention and applied to a metal spigot ring.
Figure 4:
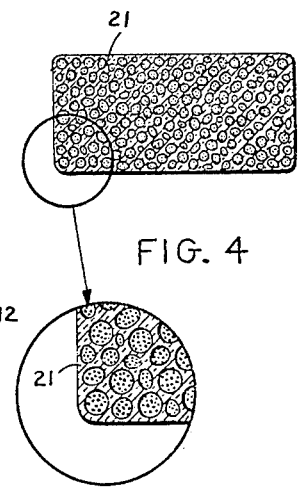
FIG. 4 is a sectional view of a polyurethane foam band according to this invention.

Because of telescoping action of the steel bell ring 13 and the steel spigot ring 14 in compressing the rubber gasket 17 therebetween, portions of the bell and spigot rings 13, 14 are necessarily exposed and may be subjected to corrosive influences. Protection of the steel rings 13, 14 is achieved by means of a bell band 19 and a spigot band 21 both made as will be discussed further herein of a polyurethane foam material having an inorganic alkaline sealant (preferably portland cement) dispersed therein. When the spigot ring 14 is inserted into the bell ring 13, the bell band 19 and the spigot band 21 are compressed between the pipes 11 and 12 as seen best in FIG. 2.

The spigot band 21 is stretched and pulled over the steel spigot ring 14 as shown in FIG. 1. The bell band 19 preferably is connected to the pipe 11 by means of a suitable adhesive. On insertion of the spigot ring 14 into the bell ring 13, the outer and inner portions of the joint have the spigot band 21 and the bell band 19 positioned respectively to protect the steel bell and spigot rings 13, 14. When ground water contacts the spigot band 21, the portland cement (or other inorganic alkaline sealant) dispersed in the polyurethane foam material generally is hydrated, thereby activating its alkalinity and corrosion inhibiting properties. (For hydroxides the chemical reaction is somewhat different because they are already hydrated, but when the hydroxides are wetted they turn into rocklike masses and they release alkalinity.) Similarly, water in the pipeline generally activates the corrosion inhibiting properties of the bell band 19. By this expedient, exposed portions of the steel bell and the spigot rings 13, 14 are protected.

Field investigations of joints protected by the system of the present invention, in different types of soils for significant periods of time, have shown that this system protects effectively against corrosion. These investigations have demonstrated also that this system is installed readily and easily by relatively inexperienced personnel. When bell and spigot bands 19, 21 of polyurethane foam having portland cement dispersed therein are used in accordance with the present invention, no additional protection to a pipeline joint is required and most particularly application of grout to the outside of the joints and application of mortar to the inside of the joint are obviated.

To make the bell and spigot bands 19, 21 a suitable inorganic alkaline sealant (preferably portland cement) is dispersed in a mixture of suitable polyols with catalyst and a foaming agent added. A polyfunctional isocyanate is then added to the mixture and, after thorough mixing, a resulting thick but flowable dispersion is poured into a mold of a suitable shape. The mold is closed and the mixture inside the mold foams and is cured into the material of the band. The bands 19, 21 are polyurethane foam containing about 40% by volume of gas and about 70% by weight of portland cement.

EXAMPLE I

A typical formulation is based on a room temperature curable, water blown polyurethane foam prepared in the following manner:

| Part A | |
|---|---|
| Isonate 143L | 93 parts |
| Part B | |
| Portland cement | 1,010 parts |
| Pluracol P2010 | 294.4 parts |
| Pluracol GP3030 | 70.2 parts |
| 24% Lead Octoate | 1.5 parts |
| Dabco 33LV | 1.7 parts |
| Silicone surfactant | 1.5 parts |
| Water | 1.9 parts |

Dabco 33LV is a 33% solution of triethylene diamine in dipropylene glycol (Dabco is a trademark of Air Products and Chemicals Company). Isonate 143L is a liquid form of diphenylmethane diisocyanate (Isonate 143L is a trademark of Upjohn Company). Pluracol P2010 is polyoxypropylene glycol with a molecular weight of about 2,000. Pluracol GP3030 is polyoxypropylene triol with a molecular weight of about 3,000 (Pluracol is a trademark of BASF-Wyandotte Corporation).

The portland cement is dispersed in the polyoxypropylene polyols (Pluracols). The other ingredients of Part B are added and mixed in. Part A then is added and thoroughly dispersed in from one to two minutes. The mixture then is cast into a mold 1"×2"×72" at room temperature. The mold is closed and, within ten minutes, the mixture foams and fills the mold. After about one hour the band is removed from the mold. The resulting band contains 68% by weight of portland cement and weighs about eight ounces per lineal foot. It is grayish brown and cellular in appearance, dense, compressible and resilient.

EXAMPLE II

Instead of water blown foam, fluorocarbon blown foams can also be prepared.

| Part A | |
|---|---|
| Isonate 143L | 15 parts |
| Part B | |
| Portland cement | 253 parts |
| Pluracol P2010 | 82 parts |
| Pluracol GP3030 | 20 parts |
| Freon 11 | 55 parts |
| 24% Lead Octoate | 1.0 parts |
| Silicone Surfactant | 1.5 parts |

Freon is trichlorofluoromethane and a trademark of DuPont de Nemoures and Company.

The portland cement is dispersed in the polyols, then the other ingredients of Part B are added and stirred in. Part A is added and the mixture is mixed thoroughly and poured into a mold preheated to 100° F. The mold is closed and placed in an oven to cure at 110° F. for thirty minutes. A product very similar to that of Example I results.

The advantage of the fluorocarbon blown foam is that more portland cement is incorporated into the composition, because the fluorocarbon lowers viscosity of the mix. The advantage of the water blown system is that the foam cures completely at low temperatures. It also is possible to use both fluorocarbon blowing agent and water together to get desirable features of both systems.

Other inorganic alkaline sealants can be used in place of portland cement to retard corrosion of metals. In order for the bands to protect steel (for example) over a long period of time, it is important that the polyurethane be somewhat permeable to water so that a maximum amount of the inorganic alkaline sealant will be available; thus, it is preferred that the polyurethane material not be so highly crosslinked as to render it unable to absorb water. It is advantageous also to use polyoxypropylene polyols terminated with substantial quantities of ethylene oxide. This type of polyol is more permeable to water and is more easily cured cold. It is also desirable to incorporate surface active agents, such as silicone surfactants, to improve dispersion of the portland cement and to increase water permeability. Other polyols including polyesters of types well known in the art of producing flexible urethane foams can be used.

Any diisocyanate, triisocyanate or polyisocynanate may be used to cure the polyol and cement mixture. Toluene diisocyanate, 4,4'-diphenyl methane diisocyanate and crude polyphenylene polymethylene polyisocyanate such as PAPI 901 (a trademark of Upjohn Company) are examples of those which may be used to prepare suitable bands.

When portland cement is used in the band, the band gradually hardens on exposure to water. The cement hydrates as the water penetrates into the band to form a rocklike mass. Also the polyurethane foam disintegrates slowly under these conditions so as to liberate alkalinity of the portland cement over a long period of time thereby preventing adjacent steel from corroding for a long period of time.

The catalyst, Dabco, is triethylene diaminine which is well known in the art for producing polyurethane foams. Other suitable catalysts include amines, lead octoate and tin octoate.

The suitable surfactants include silicone block copolymers which are available commercially, for example under a trademark L520 of Union Carbide Corporation.

In addition to service in joints of underground pipelines having steel rings, many other applications for this system are envisioned. The system basically is a rubbery, resilient, compressible material which can be used for placing portland cement which can be handled and applied readily. Before curing, a compounded mixture of polyfunctional isocyanates and polyols can be applied as a protective coating to steel parts, such as columns, girders, beams and pipes. The cured materials can also be formed into sheets, tapes, rods and the like which can be inserted into joints or cracks. The material is highly compressible and will take the shape of the joints or cracks. Once in place, this system is compressed to a stronger, denser material than the original form and it will harden slowly to give a permanent rocklike seal. Silice or fine sand can be incorporated into the original mix so that as hydration takes place the mixture will acquire the properties of concrete.

It will be understood by those familiar with structural designs that wide deviations may be made from the foregoing preferred embodiment without departing from a main theme of invention set forth in the following claims.

I claim:

1. A joint for a pipe made of concrete and having a bell and a spigot, the joint comprising a band positionable between the spigot and the bell, the band engageable in the joint by inserting the spigot into the bell, and the band being made of a porous cellular polyurethane foam material having cell walls and providing sponginess and with a hydratable cement dispersed in the cell walls whereby the cement stays in position and on absorption of water by the band the cement hydrates.

2. A pipe joint having a bell and a spigot with at least one exposed metallic component, the joint comprising a band positionable between the spigot and the bell, the band engageable in the joint by inserting the spigot into the bell, the band being made of a porous cellular polyurethane foam material having cell walls and providing sponginess and with a hydratable cement dispersed in the cell walls whereby the cement stays in position and on absorption of water by the band the cement hydrates.

* * * * *